United States Patent
Gomes

(10) Patent No.: US 11,593,208 B1
(45) Date of Patent: Feb. 28, 2023

(54) MANAGING MACHINE FAILURE

(71) Applicant: INTERNATIONAL BUSINESS MACHINES CORPORATION, Armonk, NY (US)

(72) Inventor: Louis P. Gomes, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/455,047

(22) Filed: Nov. 16, 2021

(51) Int. Cl.
*G06F 11/07* (2006.01)
*G06F 11/14* (2006.01)

(52) U.S. Cl.
CPC ...... *G06F 11/1405* (2013.01); *G06F 11/1443* (2013.01); *G06F 11/1471* (2013.01)

(58) Field of Classification Search
CPC ............. G06F 11/1405; G06F 11/1443; G06F 11/1471
See application file for complete search history.

(56) References Cited

U.S. PATENT DOCUMENTS

| | | | |
|---|---|---|---|
| 10,152,381 B1 | 12/2018 | Shvaiger | |
| 10,235,066 B1 | 3/2019 | Chen | |
| 10,536,167 B2 | 1/2020 | Pavlov | |
| 10,585,730 B1* | 3/2020 | Gomes | G06F 9/526 |
| 2015/0143011 A1* | 5/2015 | Gainey, Jr. | G06F 13/24 710/263 |
| 2022/0391286 A1* | 12/2022 | Moore | G06F 9/542 |

OTHER PUBLICATIONS

Disclosed Anonymously, "Efficient and reliable fault resilience in a Trusted Platform Module," IP.com, Mar. 10, 2006, 4 pages, IP.com No. IPCOM000134576D, Retrieved from the Internet: <URL: https://priorart.ip.com/IPCOM/000134576>.

Disclosed Anonymously, "Master Key synchronization and replication," IP.com, Oct. 30, 2020, 3 pages, IP.com No. IPCOM000264005D, Retrieved from the Internet: <URL: https://priorart.ip.com/IPCOM/000264005>.

(Continued)

*Primary Examiner* — Matthew M Kim
*Assistant Examiner* — Kyle Emanuele
(74) *Attorney, Agent, or Firm* — Teddi E. Maranzano

(57) ABSTRACT

A method, computer program product, and computer system are provided. A message storage area of an adjunct processor (AP) crypto adapter is filled with a plurality of command request messages sufficient to maximize utilization and performance of the AP crypto adapter. In response to detecting an error during execution of one of the plurality of command request messages, generating an AP crypto adapter command reply message. The AP crypto adapter command reply message includes the error. In response to the error being a non-recoverable failure, determining a state of the command request message, wherein the state of the command request message comprises an in-process state or a request-pending state. The AP crypto adapter command reply message is formatted, wherein the formatted AP crypto adapter command reply message is stored in a message queue in the AP crypto adapter pending completion of machine failure recovery. The AP crypto adapter is recovered.

20 Claims, 5 Drawing Sheets

(56) References Cited

OTHER PUBLICATIONS

Disclosed Anonymously, "Method to prevent machine checkstop during I/O subsystem failure analysis from machine check interrupt handler and greatly enhance machine failure recovery," IP.com, Jun. 25, 2003, 4 pages, IP.com No. IPCOM000016490D, Retrieved from the Internet: <URL: https://priorart.ip.com/IPCOM/000016490>.
Foss, "PERC Self-Encrypting Drive (SED) Support and FAQs," PowerEdge Product Group [online manual], 2018, 5 pages, Dell EMC, Retrieved from the Internet: <URL: https://downloads.dell.com/manuals/common/dell-emc-dfd-perc-sed-support-faq.pdf>.
Spainhower, et al., "IBM's ES/9000 Model 982's fault-tolerant design for consolidation," IEEE Micro, Feb. 1994, pp. 48-59, vol. 14, issue 1, IEEE, DOI: 10.1109/40.259900, Retrieved from the Internet: <URL: https://ieeexplore.ieee.org/document/259900>.

\* cited by examiner

AP COMMAND REQUEST MESSAGE 500

| HEADER 502 | SUB-HEADER 504 | PACKET – 0 506 | PACKET – 1 REQUEST CPRB 508 | PACKET – 1 REQUEST VRB 510 | PACKET – 2 REQUEST DB 512 |
|---|---|---|---|---|---|

FIG. 5A

AP COMMAND REPLY MESSAGE 530

| HEADER 532 | SUB-HEADER 534 | PACKET – 5 REPLY CPRB 536 | PACKET – 5 REPLY VRB 538 | PACKET – 6 REPLY DB 540 |
|---|---|---|---|---|

FIG. 5B

MANAGING MACHINE FAILURE

BACKGROUND

The present invention relates to computer systems, and more specifically to managing machine failure having an adjunct processor (AP) crypto adapter in the configuration.

Each channel attached AP crypto adapter, can be configured to operate in one of three different supported modes. Each mode has its own AP message structure and format.

When a non-recoverable failure occurs in the AP crypto adapter which prohibits completion of the requested command, the hardware architecture requires that the command requestors are notified of the AP crypto adapter failure. The AP crypto adapter is restarted to recover from the failure.

However, both operations of notifying the command requestors and restarting the AP crypto adapter cannot be done concurrently. Notifying the owners of the requested commands that the AP crypto adapter failed means restarting the failed AP crypto adapter is delayed until the owners of the requested commands dequeue the enqueued but not yet dequeued messages.

It would be advantageous to preserve the AP crypto adapter failure and report it to the owners of those requested commands after the failed crypto adapter is restarted to recover from the failure state.

SUMMARY

A method is provided. A message storage area of an adjunct processor (AP) crypto adapter is filled with a plurality of command request messages sufficient to maximize utilization and performance of the AP crypto adapter. In response to detecting an error during execution of one of the plurality of command request messages, generating an AP crypto adapter command reply message. The AP crypto adapter command reply message includes the error. In response to the error being a non-recoverable failure, determining a state of the command request message, wherein the state of the command request message comprises an in-process state or a request-pending state. The AP crypto adapter command reply message is formatted, wherein the formatted AP crypto adapter command reply message is stored in a message queue in the AP crypto adapter pending completion of machine failure recovery. The AP crypto adapter is recovered.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5A depicts one example of an Adjunct Processor Command Request Message, in accordance with one or more aspects of the present invention; and FIG. 5B depicts one example of an Adjunct Processor Command Reply Message, in accordance with one or more aspects of the present invention.

DETAILED DESCRIPTION

Figure 1A:
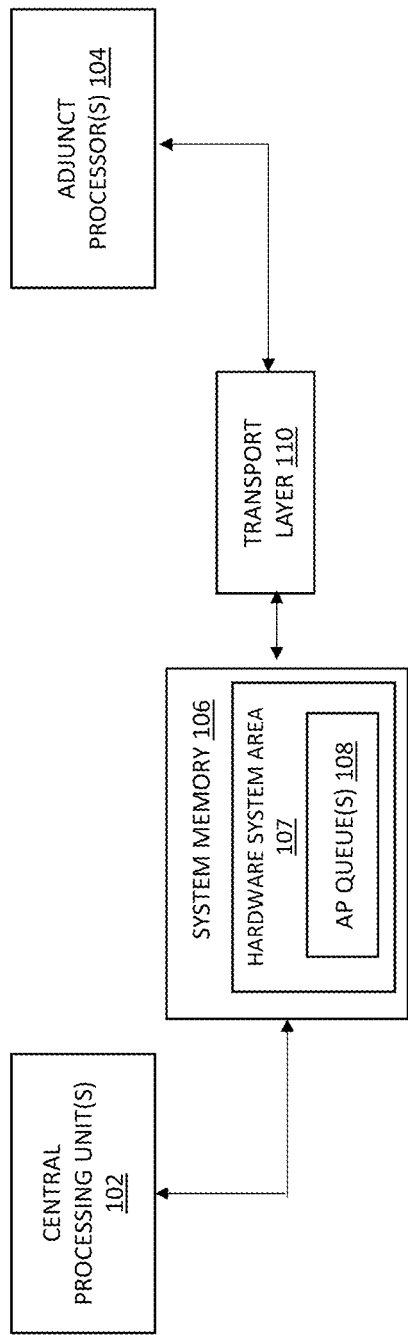
FIG. 1A depicts one example of a computing environment to incorporate and use one or more aspects of the present invention.

A cluster of hypervisors (systems) is established to provide physical machine capabilities to one or more virtual machines (VM). Each of the hypervisors executes on a computer, and has available to it all of the functions and facilities (also referred to herein collectively as "resources") of the computer on which it is executing. The resources include software instructions, machine code instructions, microcode and millicode instructions, and/or physical hardware capabilities, including one or more Cryptographic Express PCIe (CEX) AP crypto adapters. The hypervisors expose a set of the resources to the VMs, and provide a mechanism for ensuring that operations and modifications of the VMs occur in a controlled and predictable manner.

Embodiments of the present invention may be implemented on computer hardware and software that support VMs that are configured with AP crypto adapters. Here, the contexts of z/VM® and z/Architecture® are used to facilitate understanding of the elements of the present invention. (z/VM® and z/Architecture® are registered trademarks of IBM in the United States).

Conceptually, an AP crypto adapter is assigned a unique number, which is its adjunct processor number (APn 0-255). Within each APn there may be assigned up to 256 logically independent processing facilities known as domains. The APn and Domain number pair uniquely identifies an AP crypto resource with which to process work. Each such pair is served by a work queue which may comprise up to 32 elements, with each element containing at most one request message or its corresponding reply message. The number of APn and elements are exemplary, and may vary to include more or fewer, depending on the architectural implementation. Each such queue is known as an AP queue (APQ) and is uniquely identified by the APn and Domain number of the resource it serves. The concatenated AP and Domain numbers may be referred to as the AP queue number (APQN).

Each AP crypto adapter has one or more queues for transporting AP messages to and from the AP crypto adapter using the same AP queue. There are three AP commands to manage the AP messages on the AP queues. The three z/Architecture AP instructions may be implemented in millicode, which is a layer of firmware, because they are both privileged and complex. These are privileged instructions that the operating system (OS) uses to manage the workload of the AP queues. The three z/Architecture AP commands use the APQN to address a specific processing cryptographic resource. Of the three instructions:

NQAP (Enqueue Adjunct Processor) receives the AP command request message from the program storage and places it on an addressed APQN. An AP command request message may be delivered as a number of segments, each requiring separate NQAP commands. Where multiple segments are needed, the instruction returns the AP queue index or entry number (APEX) on successfully receiving the first segment. Subsequent segments require that the associated APEX be specified with the request. When an entire request message is assembled, the AP crypto adapter is able to be process it. Segmenting may occur at the instigation of either the program or the machine. Once the request message is placed on the APQN, the NQAP command completes and the request message is processed asynchronously. The AP firmware takes the AP command request message from the AP queue and sends it to the AP crypto adapter. The AP crypto adapter in turn processes the AP command request message and generates the AP command reply message, which it sends to the AP firmware. Status information is returned in the adjunct processor AP queue status word (APQSW) to indicate the success of the request. The AP firmware takes the AP command reply message from the AP and stores it to the AP queue.

DQAP (Dequeue Adjunct Processor) removes the next ready AP command reply message from the addressed APQN and places it into program storage. After completion of the DQAP, status information is returned in the APQSW to indicate the success of the reply. Once a reply has been successfully removed, the associated queue element of the AP queue becomes free to be used for a subsequent request. An AP command reply message may be returned in multiple segments, each requiring a separate DQAP to receive each segment. The first DQAP returns the APEX, which each subsequent DQAP specifies to retrieve the remaining message segments.

PQAP (Process Queue Adjunct Processor) is used in a number of querying and configuration functions relating to individual APQNs, or the entire set of APs and Domains assigned to the program. Once such query function is Test AP Queue (TAPQ), which returns configuration and operational status information about the APQN. The TAPQ function also returns whether the associated queue is full or empty and whether the queue is configured for adapter interruptions. This information may be returned in one of the general purpose register operands used. It is also used to delete all the AP messages from the target AP queue using the reset AP queue (RAQ) or zeroize AP queue (ZAQ) function. These functions are considered AP crypto adapter administrative services.

When a non-recoverable (internal) failure occurs in the AP crypto adapter which prohibits completion of the requested command, the AP crypto adapter failure must be made known to the owners of those commands, and the failed crypto card must be restarted to recover from the failure state. Since both operations cannot be done concurrently, recovering from the failure state waits until the owners of those requested commands dequeue the messages.

Embodiments of the present invention preserve the AP crypto adapter failure and report it to the owners of those requested commands after recovery. The AP crypto adapter has multiple engines and each engine can process a request message. Therefore, at any given time, the storage area could be filled with crypto card command request messages.

The AP crypto adapter firmware fills a message storage area with as many command request messages as needed to keep the AP crypto adapter busy with work, while maximizing utilization and performance. The message storage area and the number of command request messages can vary depending on the implementation.

The request messages are removed from the message storage area and processed one message at a time. An AP crypto adapter command request message can be in request-pending state, when it is waiting to be processed, or in an in-process state when it is being processed.

In response to detecting a non-recoverable (internal) failure, the AP crypto adapter firmware stops placing new command request messages into the AP crypto adapter message storage area. Before all the AP crypto adapter command request messages that are in the crypto card's message storage area are lost during the recovery, the adapter's firmware provides a machine failure reply for each of these AP crypto adapter command request messages for their owners. If the AP command is a ZAPD command, then the AP crypto adapter error code is stored in the new error return code (ERC) field of the ZAPD command reply message data area to preserve and present to the AP command owner. The reply message is created in the AP crypto adapter's firmware's internal storage. Once the reply message construction is complete, it is stored in the AP queue in the HSA 107.

If the machine firmware generates a machine failure reply code, then the machine firmware also performs a recovery action, which re-initializes the AP crypto adapter. The re-initialization after a recovery action is reported asymmetrically; that is, the AP crypto adapter re-initialization is not reported to NQAP, DQAP, and PQAP instructions as it is done for the initial AP crypto adapter initialization. This deviation is needed to return the error replies as well as the completed replies to their owners as soon as possible.

The machine firmware returns an error response code. The NQAP is terminated, the request message is not placed into the AP queue in HSA and no reply message is generated. After a successful NQAP, the request message is placed into the AP queue in HSA, it is processed by the card, a reply message is generated with an error reply code, and the reply message is placed into the AP queue in HSA.

There is also a non-recoverable (internal) crypto card failure threshold limit within a specified time. If the AP crypto adapter repeatedly receives non-recoverable (internal) AP crypto adapter failures, and reaches the failure threshold limit within a specified time, then the AP crypto adapter firmware fences off the failing AP crypto adapter by placing it into the check-stopped state.

The AP crypto adapter generates a reply message in response to the completion of the command. If the AP crypto adapter is unable to execute the command successfully, an error code is stored in the reply CPRB to indicate the failure. If the AP crypto adapter detects a non-recoverable (internal) failure, the AP crypto adapter firmware stops placing new command request messages into the AP crypto adapter's message storage area.

In this case, all the AP crypto adapter command request messages that are either in a request-pending state or in an in-process state are cleared from the message storage area, thus are lost after the failed AP crypto adapter is restarted to recover from the failure state. Before they are lost, the AP crypto adapter must provide a reply for each of these request messages for their owners. To accomplish this, the AP crypto adapter firmware generates an AP command reply message with a machine failure error (such as reply code 10) in the AP command reply message header for each AP crypto adapter command request message that is in the in-process state. This is because the AP crypto adapter firmware may not be able to identify which AP crypto adapter command request message(s) processing actually caused the non-recoverable (internal) failure. Similarly, the AP crypto adapter firmware generates an AP command reply message with preemptive machine failure error (such as reply code 12) in the AP command reply message header for each crypto card command request message that is in the request-pending state. These error replies are then posted into the AP queue so they can be dequeued later by their owners, even after the AP crypto adapter is restarted and while the AP crypto adapter is being re-initialized.

Some AP commands, such as the zeroize AP domain (ZAPD) command, have a reply message format that differs from those that include a CPRB. Therefore, these AP commands are not able to see the actual AP crypto adapter error code when certain AP reply codes, such as machine failure, are reported. Analysis of a dump of the AP crypto adapter is needed to find the AP crypto adapter error code, or alternatively, recreating the failure and capturing the error.

To provide visibility to these types of error codes, a new error return code (ERC) field is defined in the command reply message data area for these commands. The ERC field saves the AP crypto adapter error code that is returned in the reply CPRB having the AP message structure and format that corresponds to the configured mode of the AP crypto adapter. For example, if the AP command is ZAPD command, then the AP crypto adapter error code returned by the crypto card in the reply CPRB of the crypto card mode's command reply message is stored in the new error return code (ERC) field of the ZAPD command reply message data area. The machine firmware then stores the generated AP command reply message into the target AP queue.

If the machine firmware generates a machine failure reply code, then the machine firmware also performs an AP crypto adapter recovery action to recover from the machine failure state. This re-initializes the AP crypto adapter. Re-initialization after a recovery action is reported asymmetrically; that is, the AP crypto adapter re-initialization is not reported to the NQAP, DQAP, and PQAP instructions as it is done for the initial AP crypto adapter initialization. This deviation is needed to return the error replies as well as the completed replies to their owners as soon as possible. To accomplish this, when the AP message owner attempts to dequeue the AP command reply message from the AP queue, the DQAP instruction does not receive the AP busy error (such as response code 05) as it normally would. Instead, it receives one of: 1) No reply pending, i.e., there are no reply messages in the AP queue; 2) An AP command reply message with a normal completion reply code, i.e., the reply message is returned from the AP queue and contains no errors; or 3) An AP command reply message with an error reply code, i.e., the reply message is returned from the AP queue and contains an error; the error code may indicate card failure or malformed request message. Once the AP crypto adapter completes re-initialization, it is expected to be operating normally again.

There is also a non-recoverable (internal) crypto card failure threshold limit within a specified time. If the crypto card keeps encountering non-recoverable (internal) crypto card failure and reaches the non-recoverable (internal) crypto card failure threshold limit within a specified time, then the crypto card firmware fences off the failing crypto card by placing it into the check-stopped state. The NQAP, DQAP, and PQAP instructions receives AP checkstop error reply (response code 04) indicating that this crypto card is no longer operational and therefore cannot be used to perform crypto card operations.

Referring now to the figures, FIG. 1A depicts one example of a computing environment to incorporate and use one or more aspects of the present invention. The computing environment includes at least one central processing unit 102 and at least one adjunct processor (AP) 104, each of which is coupled to at least a portion of memory, referred to as system memory 106. System memory 106 includes a hardware system area (HSA) 107, which is indirectly accessible and not visible to programs executing on the central processing unit(s). Indirectly accessible is used herein to mean that the hardware system area (HSA) 107 and the AP queue(s) 108 stored therein (described below) are only accessible by specific limited instructions and not otherwise accessible. For example, programs cannot load into the hardware system area (HSA) 107 and are not aware of addresses within it. Located within the system memory 106 are one or more AP queues 108. These queues are not directly visible from user programs and are instead considered a part of the machine (i.e., the machine that includes the central processing unit(s), system memory and adjunct processor(s)). A central processing unit 102 has access to the AP queues 108 in system memory 106 by, for instance, issuing instructions, including instructions to place requests on the queue, and/or to remove replies from the queue. The AP 104, however, does have direct access to the queues via, e.g., a transport layer 110 (e.g., i390CO), and is responsible for taking requests off the queue, processing the requests, and placing replies to the requests on the queue.

Figure 1B:
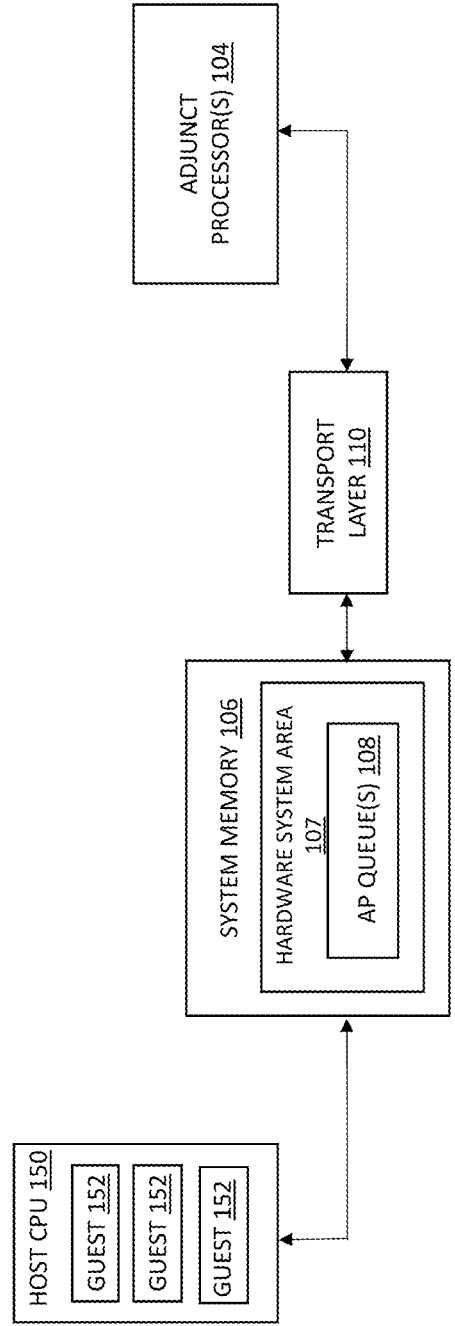
FIG. 1B depicts another example of a computing environment to incorporate and use one or more aspects of the present invention.

FIG. 1B depicts another example of a computing environment to incorporate and use one or more aspects of the present invention. In this embodiment, the machine includes virtual support, and there is at least one host central processing unit 150 that includes a plurality of guests 152 (e.g., guest operating systems and/or guest programs). The host central processing unit 150 is coupled to at least a portion of system memory 106. Additionally, there is at least one AP processor 104, which is also coupled to system memory 106 via, for instance, a transport layer 110. As one example, system memory 107 includes a hardware system area (HSA) 107, and located within the system memory 106 are one or more AP queues 108. As in FIG. 1A, the one or more AP queues 108 are not directly visible from user programs, but are accessible through privileged instructions issued by the operating system.

As indicated, there are different types of adjunct processors, including but not limited to, cryptographic adapters or adapters. A specific example of a cryptographic adapter is a Crypto Express adapter offered by International Business Machines Corporation, Armonk, N.Y. Although an example cryptographic adapter is provided, other cryptographic adapters offered by International Business Machines Corporation and/or other companies may incorporate and/or use one or more aspects of the present invention. Further, other types of adjunct processors may incorporate and/or use one or more aspects of the present invention.

In one embodiment, an adjunct processor, such as a cryptographic adapter (e.g., a Crypto Express adapter), supports a plurality of modes including, but not limited to, a Common Cryptographic Architecture (CCA) co-processor mode, an accelerator mode, and an Enterprise Public Key Cryptographic Standards (PKCS) mode (e.g., XCP/EP11—Enterprise PKCS#11), as examples. Additional, fewer and/or other modes may be supported in other examples. Each of the modes may have its own AP message structures and formats.

As an example, an adjunct processor message is comprised of multiple data segments and the data segments may not be adjacent to each other; instead, one or more may be interleaved. In one example, a cryptographic adapter does not have direct access to the enqueued AP message and a portion of the message (e.g., the bottom part of the AP message) contains the data to be used by, e.g., the cryptographic adapter to execute the AP command. Therefore, the AP command transport layer (e.g., transport layer 110) copies the relevant data from the AP command request message, packages it in a format that is compatible with the cryptographic AP (e.g., crypto adapter's command request message) and sends it to the cryptographic adapter. Similarly, after the AP command is executed by the cryptographic adapter, the cryptographic adapter generates a cryptographic adapter command reply message that includes, e.g., packets 5 and 6 of FIG. 5B, and sends it to the AP command transport layer 110, which re-packages it into an AP command reply message. For instance, the transport layer 110 uses various parts of the AP command request message and the cryptographic adapter's command reply message to provide the AP command reply message, including the header, sub-header and packets. The transport layer then sends the AP command reply message to the AP queue to be dequeued later by the program. Further details of an AP command request message and an AP command reply message are described with reference to FIGS. 5A and 5B.

Figure 2:
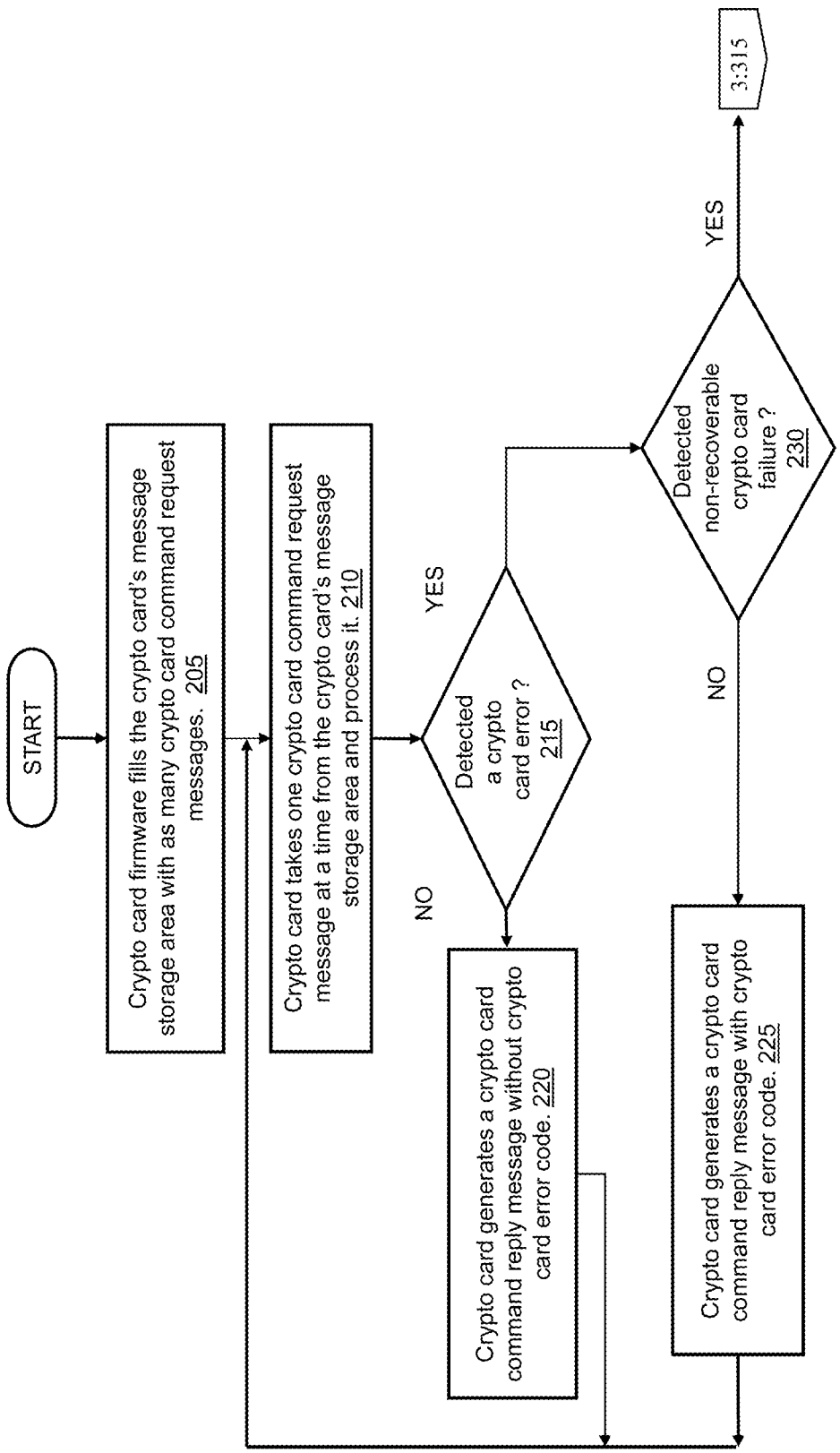
FIG. 2 illustrates a flow of generating and preserving of AP command reply messages after a non-recoverable AP crypto adapter failure, according to one or more aspects of the present invention.

Turning now to FIG. 2, generating and preserving AP command reply messages after a non-recoverable AP crypto adapter failure is illustrated.

At 205, the AP crypto adapter firmware fills the message storage area with as many command request messages as needed to keep the AP crypto card busy within configured parameters of utilization and performance.

At 210, the AP crypto adapter removes one command request message at a time from its message storage area and processes it.

Figure 3:
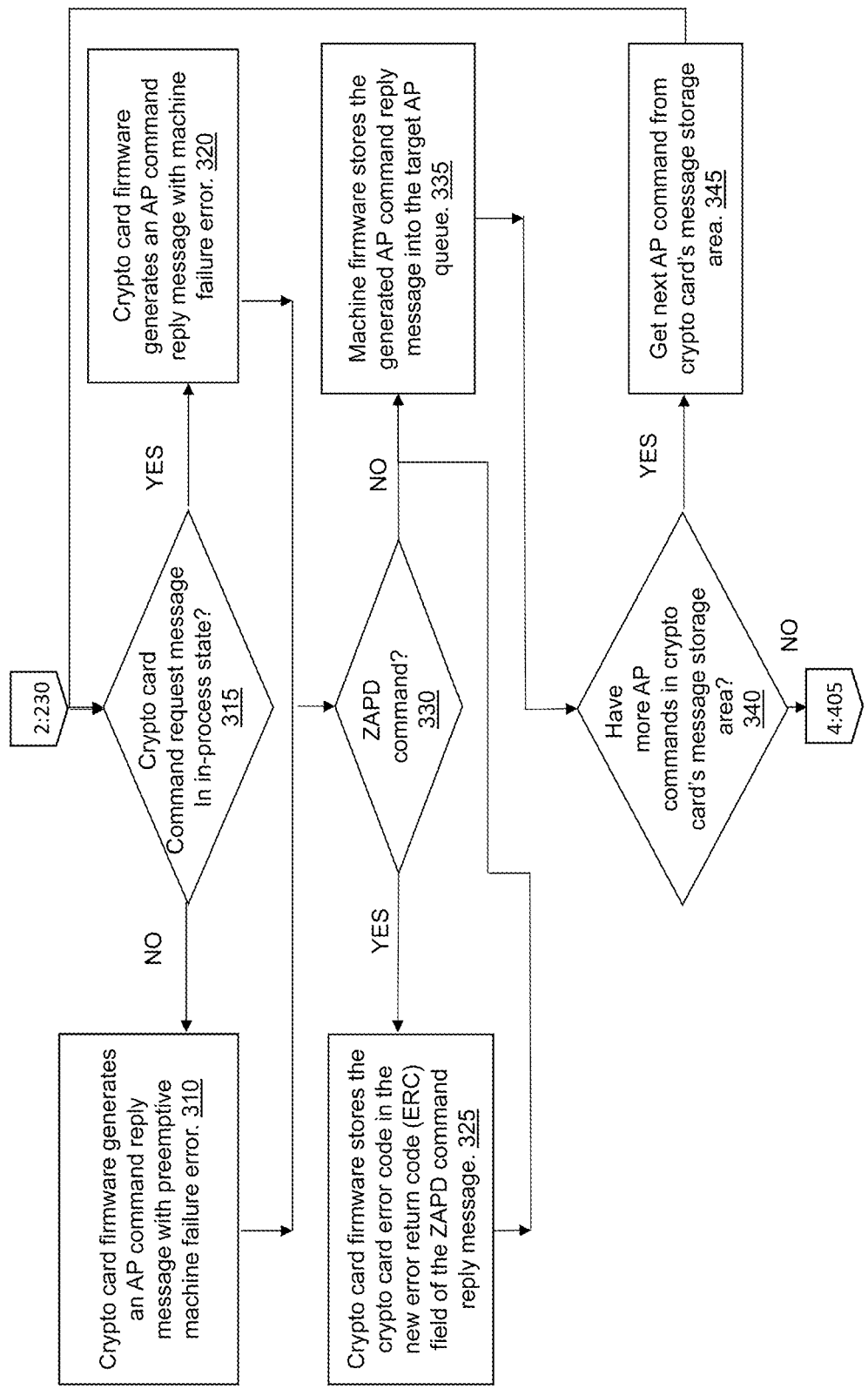
FIG. 3 illustrates a flow of machine failure recovery, according to one or more aspects of the present invention.

At 215, if the AP crypto adapter firmware detects a crypto card error, then at 230 if the detected error is non-recoverable (230), processing continues to 315 of FIG. 3. For an error that is not a non-recoverable error, at 225 the AP crypto adapter generates a command reply message with the error code, and processing returns to 210 to the next command request message.

However, if at 215 no error was detected, then the command reply message, generated at 220, will not include an error code. Even though no error was detected, there could be non-card error. For example, a malformed request message. The error code may be placed in the CPRB return/reason code and/or a different error code in the reply code field. Processing returns to 210 to the next command request message.

FIG. 3 illustrates a flow of machine failure recovery, and is entered from 230 of FIG. 2.

At 315, the inquiry is whether the command request message is in the in-process state, i.e., the AP crypto adapter is now processing the request message. If so, then at 320 the AP crypto adapter firmware generates an AP command reply message that includes an indicator of a machine failure error. If the command request message is not in the in-process state, i.e. in the request-pending state, then at 310 the AP crypto adapter firmware generates an AP command reply message that includes a preemptive machine failure error. This type of error is preemptive because had the AP crypto adapter attempted to process the request message, a machine failure would occur, since the AP crypto adapter is in an unrecoverable error state.

In either the case of 320 or 310, if at 330 the command being processed is ZAPD, then error reporting in the command reply message is treated differently from commands having a CPRB. For a ZAPD command, at 325 the AP crypto adapter firmware stores the error code in the ERC field of the ZAPD command reply message, and then at 335, the machine firmware stores the AP command reply message into the target AP queue. If the command is not ZAPD, then it is not necessary to store an error code into the ERC field, because the command reply message uses the CPRB. The AP command reply message is stored by the machine firmware into the target AP queue.

At 340, if there are more AP commands in the AP crypto adapter message storage area, then at 345 the AP crypto adapter removes the next command request from its message storage area and processes it.

Figure 4:
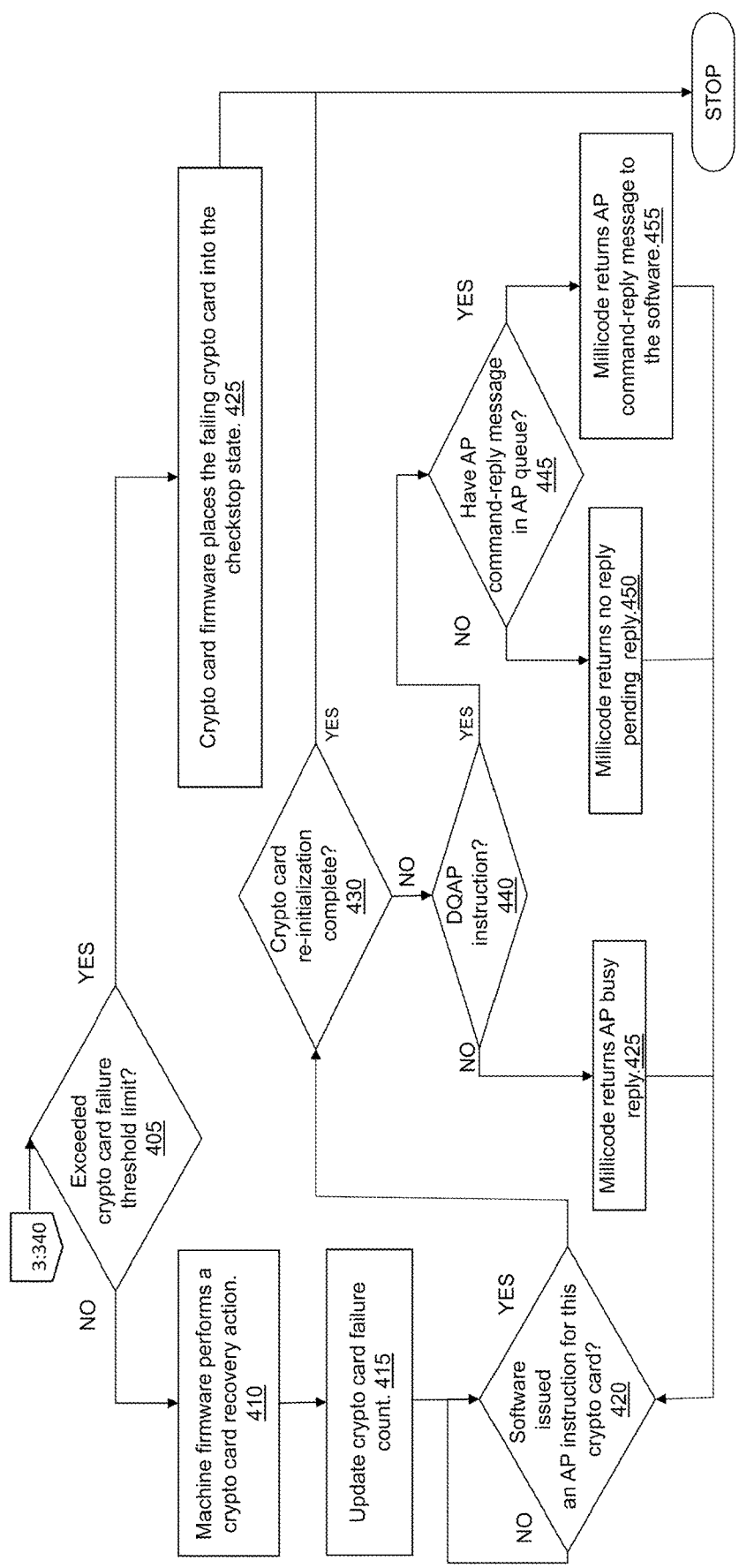
FIG. 4 illustrates a further flow of machine failure recovery, according to one or more aspects of the present invention.

FIG. 4 illustrates a further flow of machine failure recovery, following FIG. 3 and is entered from 340 of FIG. 3.

At 405, the inquiry is whether the AP crypto adapter failure count exceeds a configurable limit for the specified time. A log of failure and failure time is kept for the specified time. It counts the number of failures for the specified time window that ends with the current time. If a failure occurs passed the specified time window, that failure is no longer counted.

The purpose is to fence off an AP crypto adapter that is generating repeated non-recoverable errors. If an AP crypto adapter has bad hardware or software that is causing the error, the error would occur frequently. The time window can be configured/sized appropriately. A too small time window may not reach the threshold and therefore not fence off the failing AP crypto adapter, where a too large time window may not reach the threshold quick enough and flood the machine with errors and error outputs. The configured window can be based on performance metrics, such as a time window in minutes.

If the threshold is exceeded, then at 425, the AP crypto adapter firmware places the failing adapter into checkstop state, since its operational state is such that the AP crypto adapter cannot reliably resume execution, and processing ends.

Returning to 405, if the threshold is not exceeded, then at 410 the machine firmware performs an AP crypto adapter recovery action, i.e., restarting the AP crypto adapter, and at 415 the machine firmware updates the AP crypto card failure count.

At 420, the AP crypto adapter can receive an AP instruction from software, which can be the server or VM OS, or an application program. However, the AP crypto adapter can continue to wait for an AP instruction to process.

At 430, when an AP instruction is received, then if the machine firmware determines that the re-initialization is complete, the AP instruction can execute, and processing ends.

If at 430, the AP instruction was received, but the AP crypto adapter re-initialization is not complete, then at 440 the AP firmware checks for whether the DQAP instruction is the received AP instruction, since only the DQAP can remove a reply message from the AP queue. If the received AP instruction is other than the DQAP instruction, then millicode returns an AP busy reply at 425, and processing returns to 420 where the AP crypto adapter waits for another AP instruction.

At 440, if the received AP instruction is DQAP, then at 445 AP firmware checks for a command reply message in the AP queue.

At 445, if a command reply message is not queued, then at 450 millicode returns a no reply pending reply, and the AP crypto adapter waits for another AP instruction. However, if a command reply message is queued, then at 455, millicode returns the AP command reply message to the software, and the AP crypto adapter waits for another AP instruction.

FIG. 5A depicts an example of an Adjunct Processor Command Request Message, in accordance with one or more aspects of the present invention.

In one example, an AP command request message 500 includes a header 502, a sub-header 504, and a plurality of packets 506-512. In one example, one or more of the packets (e.g., one or more of packet-1 508-510) is configured to provide a command and one or more of the packets (e.g., packet-2 512) is configured to provide input data. One of the packets includes a request connectivity programming request block (CPRB) 508 that includes one or more indicators related to command-type filtering, as well as other indicators, flags, bits, etc.

FIG. 5B depicts an example of an Adjunct Processor Command Reply Message, in accordance with one or more aspects of the present invention.

In response to a message, a reply is provided, and in one example, is in the form of an AP command reply message, an example of which is depicted in FIG. 5B. As shown, an AP command reply message 530 includes, for instance, a header 532, a sub-header 534, and a plurality of packets 536-540. One of the packets includes a reply CPRB 536 that includes a reply to the request and may indicate an error, such as a return code or a reason code.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method, comprising:
    filling a message storage area of an adjunct processor (AP) crypto adapter with a plurality of command request messages sufficient to maximize utilization and performance of the AP crypto adapter;
    in response to detecting an error during an execution of one of the plurality of command request messages, generating an AP crypto adapter command reply message, wherein the AP crypto adapter command reply message includes the error;
    in response to the error being a non-recoverable failure, determining a state of the command request message having the error, wherein the state of the command request message having the error comprises an in-process state or a request-pending state;
    formatting the AP crypto adapter command reply message, wherein the formatted AP crypto adapter command reply message is stored in a message queue in the AP crypto adapter pending completion of machine failure recovery; and
    recovering the AP crypto adapter.

2. The method of claim 1, further comprising:
    including a machine failure error in the command reply message, based on the error being the non-recoverable failure and the state being in-process; and
    including a preemptive machine failure error in the command reply message, based on the error being the non-recoverable failure and the state being request-pending.

3. The method of claim 1, wherein formatting the AP crypto adapter command reply message further comprises:
    storing, by AP crypto adapter firmware, the error in an error return code field of the command reply message, based on an AP command not having a corresponding connectivity programming request block; and
    storing, by machine firmware, the formatted AP crypto adapter command reply message in the message queue in the AP crypto adapter.

4. The method of claim 1, further comprising:
    in response to an AP crypto adapter failure count not exceeding a failure threshold limit, machine firmware recovering the AP crypto adapter, wherein the recovering includes updating the AP crypto adapter failure count.

5. The method of claim 1, further comprising:
    in response to an AP crypto adapter failure count exceeding a failure threshold limit, the AP crypto adapter firmware placing the AP crypto adapter in checkstop state.

6. The method of claim 1, wherein based on receiving an AP instruction during AP crypto card recovery, millicode returning a busy reply to the AP instruction being other than DQAP.

7. The method of claim 1, wherein in response to a received AP instruction being DQAP, millicode returning a no reply pending reply or the command reply message, based on there being the command reply message in the message queue in a target AP crypto adapter.

8. A computer program product, the computer program product comprising a non-transitory tangible storage device having program code embodied therewith, the program code executable by a processor of a computer to perform a method, the method comprising: filling a message storage area of an adjunct processor (AP) crypto adapter with a plurality of command request messages sufficient to maximize utilization and performance of the AP crypto adapter; in response to detecting an error during an execution of one of the plurality of command request messages, generating an AP crypto adapter command reply message, wherein the AP crypto adapter command reply message includes the error; in response to the error being a non-recoverable failure, determining a state of the command request message having the error, wherein the state of the command request message having the error comprises an in-process state or a request-pending state; formatting the AP crypto adapter command reply message, wherein the formatted AP crypto adapter command reply message is stored in a message queue in the AP crypto adapter pending completion of machine failure recovery; and recovering the AP crypto adapter.

9. The computer program product of claim 8, further comprising:
    including a machine failure error in the command reply message, based on the error being the non-recoverable failure and the state being in-process; and
    including a preemptive machine failure error in the command reply message, based on the error being the non-recoverable failure and the state being request-pending.

10. The computer program product of claim 8, wherein formatting the AP crypto adapter command reply message further comprises:

storing, by AP crypto adapter firmware, the error in an error return code field of the command reply message, based on an AP command not having a corresponding connectivity programming request block; and storing, by machine firmware, the formatted AP crypto adapter command reply message in the message queue in the AP crypto adapter.

11. The computer program product of claim 8, further comprising:

in response to an AP crypto adapter failure count not exceeding a failure threshold limit, machine firmware recovering the AP crypto adapter, wherein the recovering includes updating the AP crypto adapter failure count.

12. The computer program product of claim 8, further comprising:

in response to an AP crypto adapter failure count exceeding a failure threshold limit, the AP crypto adapter firmware placing the AP crypto adapter in checkstop state.

13. The computer program product of claim 8, wherein:

based on receiving an AP instruction during AP crypto card recovery, millicode returning a busy reply to the AP instruction being other than DQAP; and in response to the received AP instruction being DQAP, millicode returning a no reply pending reply or the command reply message, based on there being the command reply message in the message queue in a target AP crypto adapter.

14. A computer system, the computer system comprising:

one or more processors;

a memory coupled to at least one of the processors;

a set of computer program instructions stored in the memory and executed by at least one of the processors in order to perform actions of:

filling a message storage area of an adjunct processor (AP) crypto adapter with a plurality of command request messages sufficient to maximize utilization and performance of the AP crypto adapter;

in response to detecting an error during an execution of one of the plurality of command request messages, generating an AP crypto adapter command reply message, wherein the AP crypto adapter command reply message includes the error;

in response to the error being a non-recoverable failure, determining a state of the command request message having the error, wherein the state of the command request message having the error comprises an in-process state or a request-pending state;

formatting the AP crypto adapter command reply message, wherein the formatted AP crypto adapter command reply message is stored in a message queue in the AP crypto adapter pending completion of machine failure recovery; and recovering the AP crypto adapter.

15. The computer system of claim 14, further comprising:

including a machine failure error in the command reply message, based on the error being the non-recoverable failure and the state being in-process; and including a preemptive machine failure error in the command reply message, based on the error being the non-recoverable failure and the state being request-pending.

16. The computer system of claim 14, wherein formatting the AP crypto adapter command reply message further comprises:

storing, by AP crypto adapter firmware, the error in an error return code field of the command reply message, based on an AP command not having a corresponding connectivity programming request block; and storing, by machine firmware, the formatted AP crypto adapter command reply message in the message queue in the AP crypto adapter.

17. The computer system of claim 14, further comprising:

in response to an AP crypto adapter failure count not exceeding a failure threshold limit, machine firmware recovering the AP crypto adapter, wherein the recovering includes updating the AP crypto adapter failure count.

18. The computer system of claim 14, further comprising:

in response to an AP crypto adapter failure count exceeding a failure threshold limit, the AP crypto adapter firmware placing the AP crypto adapter in checkstop state.

19. The computer system of claim 14, wherein based on receiving an AP instruction during AP crypto card recovery, millicode returning a busy reply to the AP instruction being other than DQAP.

20. The computer system of claim 14, wherein in response to a received AP instruction being DQAP, millicode returning a no reply pending reply or the command reply message, based on there being the command reply message in the message queue in a target AP crypto adapter.

* * * * *